Dec. 12, 1967 C. B. SWAN 3,358,215

VARACTOR HARMONIC GENERATOR INCLUDING A PIN DIODE SHUNT

Filed Sept. 28, 1965 2 Sheets-Sheet 1

INVENTOR
C. B. SWAN
BY
Roderick B. Anderson
ATTORNEY

Dec. 12, 1967 C. B. SWAN 3,358,215

VARACTOR HARMONIC GENERATOR INCLUDING A PIN DIODE SHUNT

Filed Sept. 28, 1965 2 Sheets-Sheet 2

United States Patent Office 3,358,215
Patented Dec. 12, 1967

3,358,215

VARACTOR HARMONIC GENERATOR INCLUDING A PIN DIODE SHUNT

Clarence B. Swan, Warren Township, Somerset County, N.J., assignor to Bell Telephone Laboratories, Incorporated, New York, N.Y., a corporation of New York Filed Sept. 28, 1965, Ser. No. 490,873
8 Claims. (Cl. 321—69)

This relates to frequency changing apparatus and, more particularly, to harmonic generators using a varactor as the non-linear harmonic generating element.

A harmonic generator typically includes a non-linear element for generating harmonic frequencies in response to an input frequency, and a filter arrangement for selecting a particular desired frequency harmonic. Semiconductor diodes known as varactors are widely used and have special advantages as non-linear elements in harmonic generators. For example, a chain of varactor frequency multipliers, driven by a transistor oscillator, makes a very practical solid state source of microwave power. Because the invention is of primary interest in connection with harmonic generators, the invention will be described as embodied in a harmonic generator. However, it will be obvious that its principles may be similarly incorporated in other forms of frequency changing apparatus, such as subharmonic generators and frequency converters.

For some purposes, as for example, when the harmonic generator is used as a source of pump power for a parametric amplifier, it is important that the output power be maintained at a constant level within fairly exacting tolerances. A feedback circuit is therefore sometimes used for controlling the direct-current bias of the varactor in response to the generated harmonic frequency output power.

The varactor bias, in this instance, is used to detune the harmonic generator circuits to achieve output power level control. Successful operation requires that the harmonic generator output be a predetermined function of bias voltage. Unfortunately, appreciable bias changes may mismatch the varactor tuned circuits of the harmonic generator to such an extent as to cause the varactor to break into unwanted parametric oscillations. This can cause associated spurious responses in the output frequency band resulting in discontinuities in the output power versus bias characteristics. Because of this tendency, large varactor bias changes may be intolerable. Considerable effort is then required to maintain the power of the input energy within limited ranges.

Accordingly, it is an object of this invention to control the output power of a varactor harmonic generator device over a relatively wide range without causing spurious oscillations or discontinuities in the output power level.

These and other objects of the invention are attained in a harmonic generator including a varactor as a non-linear element for generating harmonic frequencies. In accordance with a principal feature of the invention, the varactor is shunted by a PIN diode. The resistance presented by the PIN diode to radio frequency (R-F) input currents is a function of the direct-current bias of the PIN diode. Hence, by controlling the PIN diode bias, one can control the R-F current to the varactor and therefore the output power of generated harmonic frequencies. Furthermore, this control is achieved by resistively shunting the varactor which inhibts parametric oscillations.

In an illustrative frequency multiplier circuit to be described, the output R-F harmonic frequency power is sampled by a radio frequency detector which generates a direct-current voltage in response to the R-F power. This voltage is compared with a reference voltage in a differential amplifier, with the output of the differential amplifier being used to bias the PIN diode. In this manner, changes in the output R-F power automatically generate a correction current which effectively changes the efficiency of the harmonic generator. Hence, the output harmonic frequency power of the harmonic generator can be maintained at a precise predetermined level.

I have found that if my device is to be used to maximum advantage, the PIN diode must be connected in extremely close proximity to the varactor. Specifically, for optimum results, the R-F path between the varactor and the PIN diode should be much less than one-quarter of a wavelength at the operating frequency. As a practical matter, this in turn requires that the PIN diode and the varactor be mounted within the same package. If they were mounted in separate packages the changes of R-F resistance of the PIN diode would not appear as purely resistive changes at the varactor and the resulting detuning of the varactor circuits would tend to cause spurious oscillations.

In accordance with another feature of the invention, the PIN diode and varactor are both mounted on a single substrate. The substrate is preferably of insulative material that is coated with a conductive film. The varactor and PIN diodes are mounted on a top surface of the conductive film with most of the remainder of the top surface being covered with a thin film of insulative material. Similar circularly-shaped sheet conductors surround and contact the PIN diode and the varactor and overlap the conductive film. Appropriate bias voltages to the two devices are made by contacting each of these two circular conductors. R-F connection to the devices is made by a contact that is common to both devices.

The circular conductors form with the conductive film two bypass capacitors which permit separate direct-current biasing of the two devices. While the common R-F contact to the varactor and PIN diode is extremely short as required for stable operation, the circular conductors provide relatively large area capacitors for application of separate bias voltages and for giving the required bypass capacitance. The single package may be inserted in a coaxial cable or waveguide transmission line of the harmonic generator circuit with parallel R-F paths extending through the common contact, the two devices, the bypass capacitors, and the conductive film. The bias voltages are preferably applied to the circular conductive plates by way of thin film leads which provide the required bias resistance.

These and other objects and features of my invention will be better appreciated from a consideration of the following detailed description, taken in conjunction with the accompanying drawing, in which.

Figure 1:
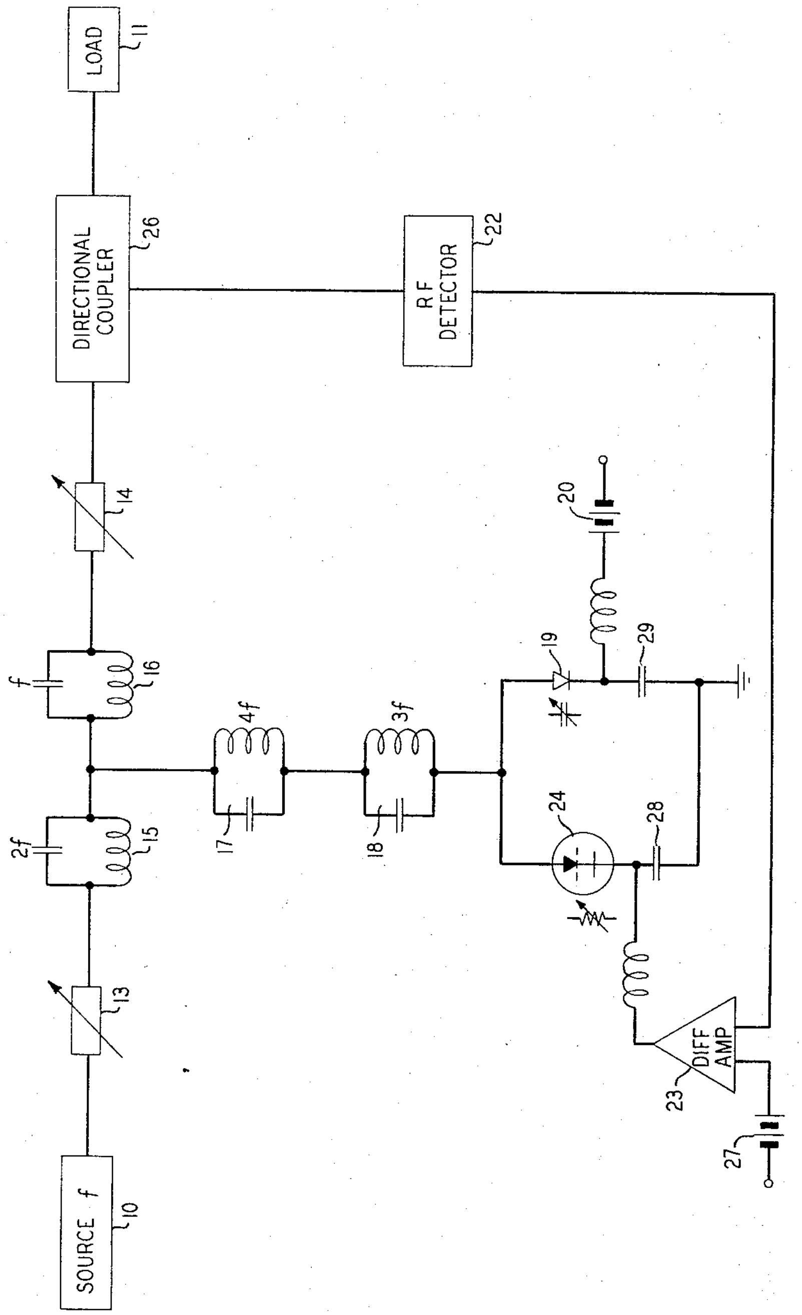
FIG. 1 is a schematic illustration of a frequency multiplier employing the principles of the invention.

Referring now to FIG. 1, there is shown, as an illustrative embodiment of the invention, a frequency doubler circuit for doubling the frequency $f$ of R-F energy from a source 10 which is to be transmitted to a load 11. The circuit comprises an input adjustable reactance tuning element 13, an output adjustable reactance tuning element 14, band stop filters 15, 16, 17 and 18, a varactor 19, and a direct-current source 20 for biasing the varactor. The construction and operation of these elements are described on page 336 of the book "Varactor Applications," by Penfield and Rafuse, The M.I.T. Press, 1962. The filters 15, 16, 17, and 18 constitute band stops at frequencies $2f$, $f$, $4f$, and $3f$, respectively, where $f$ is the input frequency. The representation of varactor 19 is intended to illustrate that it is a variable capacitance diode. With the varactor 19 biased at an optimum voltage by bias source 20, and with the tuning elements 13 and 14 properly adjusted so as to match the impedance of the varactor with that of source 10 and the load 11, the varactor will generate harmonics of the input frequency with substantially only the second harmonic being transmitted to the load 11. The filters 16, 17, and 18, of course, block the frequencies *f*, 3*f*, and 4*f*.

Depending upon system requirements, an unmodified frequency doubler circuit of the type shown in the Penfield and Rafuse book may produce output currents having intolerable power variations. For example, if the output is to be used as pump energy for a parametric amplifier, the requirements for output power stability may be quite stringent. Variations in output power may be caused, for example, by variations of input power, varactor bias, or other circuit parameters. If a chain of varactor frequency multipliers is used, each of which is biased at maximum efficiency, variations of input power may be greatly exaggerated by the successive multiplication process.

In accordance with the invention, the output power of the harmonic generator is maintained at a substantially constant level by a control circuit comprising a radio frequency detector 22, a differential amplifier 23, and a PIN diode 24. A variable resistance designation is included in the representation of the PIN diode because, as is known, the radio frequency resistance of a PIN diode can be varied by varying the bias voltage. A sample of the output power of the harmonic generator is directed to the R-F detector 22 by a directional coupler 26. The detector generates a direct-current voltage as a function of the radio frequency output power which is compared with a reference voltage from the direct-current source 27. The differential amplifier 23 detects and amplifies the voltage difference from detector 22 and source 27 and transmits it to the PIN diode 24. R-F bypass capacitors 28 and 29 permit different D-C bias voltages on the two devices 24 and 19.

As is known, a PIN diode has a very high R-F resistance under a zero or reverse bias condition, with the R-F resistance increasing with increasing forward bias voltages. Hence, in the circuit of FIG. 1, PIN diode 24 shunts R-F current from the varactor 19 as a function of its forward bias. When the PIN diode 24 has a zero of reverse bias, it constitutes an effective open circuit, but as the forward bias increases, its resistance decreases and it begins to shunt the varactor. Part of both the input R-F current to the varactor and output current generated by the varactor is drained off by the PIN diode. With the PIN forward bias being an appropriate function of the output R-F power detected by detector 22, it can be appreciated that the output power of the harmonic generator can in this manner be controlled to within precise limits. The construction of directional coupler 26, R-F detector 22, differential amplifier 23, and the selection of an appropriate reference voltage for source 27 for the purpose of maintaining a constant level of output power of the illustrative frequency doubler, are design considerations within the ordinary skill of a worker in the art.

In accordance with an important feature of the invention, the R-F interconnection of PIN diode 24 and varactor 19 is very short. Specifically, it is much shorter than a quarter wavelength at the operating frequency *f*. Frequency *f* in most cases of interest is in excess of one kilomegacycle per second and in virtually all cases is in excess of 200 megacycles per second. If a short interconnection is not used, it can be shown that unavoidable reactances of the interconnection will prevent the PIN diode from resistively shunting the varactor at all frequencies. This can cause a reduction of control range as well as introducing serious mismatches if the bias voltage of the PIN diode is varied over an appreciable range. The requirement of the short R-F interconnection implies that the PIN diode 24 and the varactor 19 be mounted within a single semiconductor package. This introduces problems of fabrication because the PIN diode and the varactor must be separately biased, as is clear from FIG. 1. To this end bypass capacitors 28 and 29 should be incorporated into the package.

Figure 2:
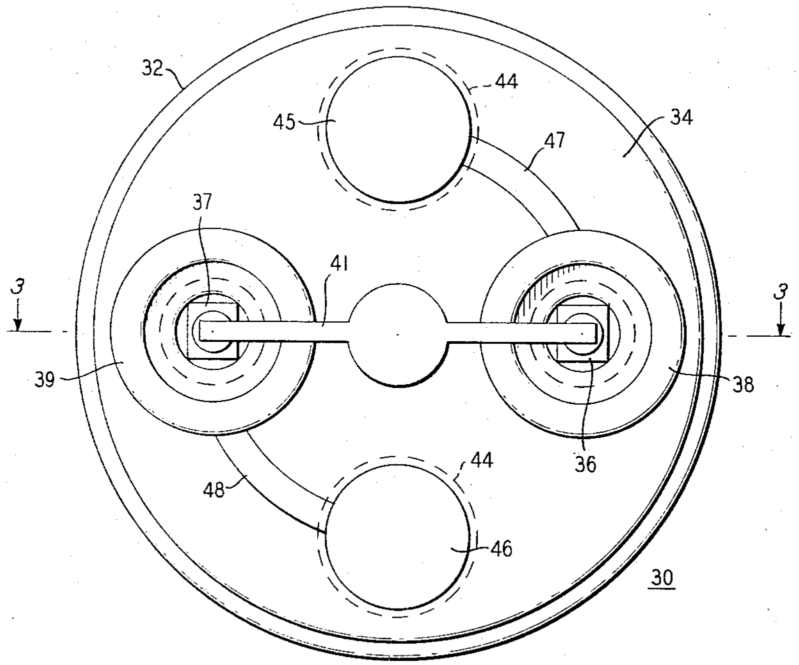
FIG. 2 is a top view of a semiconductor package in accordance with the invention.
Figure 3:
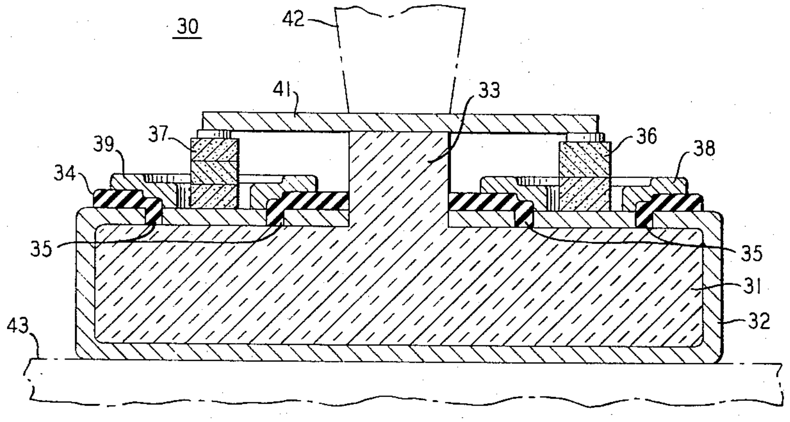
FIG. 3 is a view taken along lines 3—3 of FIG. 2.

These problems are surmounted in the semiconductor package 30 shown in FIGS. 2 and 3 which comprises an insulative base 31 that is almost completely covered with a conductive coating 32. Located in the center of the top surface of the base and face of coating 32 is a pedestal 33. The coating over much of the remaining area of the top surface is overlayed with a thin film 34 of insulative material such as alumina. Mounted on opposite sides of the pedestal in an area free of film 34 but on coating 32 are a varactor 36 and a PIN diode 37. Annular openings 35 in the upper surface of the conductive film 32 insulate the varactor and the PIN diode. Respectively surrounding the varactor and the PIN diode are flat circular conductors 38 and 39 both of which overlap, but are insulated from the conductive coating 32. Mounted on the top of pedestal 33 is an R-F contact 41 which interconnects the varactor and the PIN diode. The package is mounted between opposite conductors 42 and 43 of an R-F circuit. Conductor 43 may, for example, be the ground conductor of a coaxial cable, while conductor 42 contacts the inner conductor of the cable. Alternatively, conductor 42 may be a waveguide stub and connector 43 a waveguide wall.

The base 31 is cylindrical in shape with a typical diameter of .100 inch and a height of .035 inch. It can therefore be appreciated that the varactor and PIN diode 37 are in very close proximity as is required for optimum operation. The R-F contact 41 is so short that it gives a true R-F short circuit without any substantial parasitic reactances. As seen in FIG. 2, a pair of bias leads 45 and 46 extend through the base 31. Annular openings 44 in conductive coating 32 insulate leads 45 and 46. Bias lead 45 contacts circular conductor 38 of the varactor 36 by way of a thin film resistor 47 overlayed on the insulative coating 34, while the bias lead 46 is connected to circular conductor 39 by a similar thin film resistor 48.

In operation, the input frequency R-F energy follows two parallel paths from conductor 42 to conductor 43: one of the paths is through R-F contact 41, varactor 36, a bypass capacitance formed by conductor 38 and conductive film 32, and hence to conductor 43; the other path is through R-F contact 41, PIN diode 37, a bypass capacitance formed by conductor 39 and conductive film 32, and hence to the conductor 43. The output frequency energy generated in the varactor 36 also follows two paths: one of the paths is through conductor 42 where it is transmitted by the circuit to the load; the other path is through the PIN diode 37 and the bypass capacitor to conductor 43. The bias leads 45 and 46 of FIG. 2 are connected to appropriate sources as shown in the circuit diagram of FIG. 1.

Thin film bias resistors 47 and 48 may be evaporated Nichrome or tantalum having a thickness of between 300 and 3000 angstroms. The conductive films 32, the annular openings 35, the insulative coating 34, and the conductors 38 and 39 may be formed by thin film techniques including appropriate evaporation, and etching steps as are well known in the art. The insulative film 34 may be aluminum oxide having a thickness of about 1 micron.

A specific feature of the structure of FIGS. 2 and 3 are the R-F bypass capacitors formed by conductors 39 and 38 with the conductive film 32. As best seen in FIG. 2 these capacitors have a relatively large area while still permitting a short physical separation between the varactor and the PIN diode. Because the varactor and the PIN diode are located at the center of the two bypass capacitors, the R-F currents from them are distributed uniformly along the area of each of the two capacitors for giving a maximum capacitance. As is known, capacitance is a function of the area of overlapping capacitor plates. This applies, however, only when the current paths along the overlapping surfaces are much less than a quarter wavelength. The radial design used therefore permits good quality bypass capacitances to be achieved at microwave frequencies.

In summary, it can be seen that the circuit of FIG. 1 is effective for controlling the output power of a varactor harmonic generating element. Maximum effectiveness, however, requires an extremely short common R-F contact between the varactor 19 and the PIN diode 24. Further, separate biasing of the two devices requires bypass capacitors 23 and 29 of sufficiently high capacitance. These fabrication requirements are met in the structure of FIGS. 2 and 3 which permits a physically short common R-F contact 41, separate biasing of the two devices 36 and 37, and sufficiently high bypass capacitance for the parallel R-F paths. These requirements are met in a device which is easily fabricated using standard thin film techniques.

It is to be understood that the frequency doubler of FIG. 1 illustrates only one practical use of my technique for controlling the output of a varactor diode. It could be used in other frequency multipliers, and in subharmonic generators and frequency converters. Further, the technique could be used to vary, rather than keep constant, the output power; a varying PIN bias could, for example, be used to modulate the output of the harmonic generator. The package structure of FIG. 3 could be modified by making the base 31 entirely out of conductive material and by mounting the devices 36 and 37 on the insulative overlay 34. Numerous other embodiments and modifications may be made by those skilled in the art without departing from the spirit and scope of the invention.

What is claimed is:

1. In apparatus for changing the frequency of energy from a radio-frequency energy source and transmitting a to a load, the combination comprising:
a varactor connected between the source and the load for generating harmonics of the input frequency;
a PIN diode connected in parallel with the varactor;
direct-current means for biasing the PIN diode;
and means for controlling the efficiency of harmonic generation comprising means for controlling the PIN direct-current bias.

2. The combination of claim 1 wherein:
the interconnection of the PIN diode with the varactor has an electrical length of much less than a quarter wavelength at the input frequency.

3. The combination of claim 2 further comprising:
a feedback circuit including a radio frequency detector and a source of reference voltage;
said feedback circuit comprising means for controlling the direct-current bias of the PIN diode in response to changes of the power of the generated harmonic frequencies.

4. Frequency changing apparatus comprising:
a base of insulative material having upper, lower and side surfaces;
a first coating of conductive material covering a major portion of the upper, lower, and side surfaces of the base;
a thin film of insulative material covering the major portion of the upper surface of the first conductive coating;
second and third coatings of conductive material covering part of the film of insulative material;
a varactor in contact with the second coating;
a PIN diode in contact with the third coating;
metans contacting the second coating for direct-current biasing the varactor;
means contacting the third coating for direct-current biasing the PIN diode;
a common contact interconnecting the varactor and the PIN diode for transmitting radio frequency current thereto;

the contact being much smaller than a quarter wavelength at the frequency of said current;
an output conductor connected to the bottom surface of the first coating;
the second and third coatings overlapping substantial portions of the first coating and being insulated therefrom by the film to form therewith radio frequency bypass capacitors, whereby parallel radio frequency paths are established from the common contact, through the varactor and the PIN diode, the bypass capacitors, the first coating, to the output conductor;
and means for varying the bias of the PIN diode thereby to control the R-F current through the varactor.

5. In combination:
a base having conductive upper, lower, and side surfaces;
a thin film of insulative material covering a major portion of the upper conductive surface of the base;
second and third coatings of conductive material covering part of the film of insulative material;
a first semiconductor device in contact with the second coating;
a second semiconductive device in contact with the third coating;
means contacting the second coating for direct-current biasing the first semiconductor device;
means contacting the third coating for direct-current biasing the second semiconductor device;
a common contact interconnecting the first and second semiconductor devices for transmitting radio frequency semiconductor devices for transmitting radio frequency current thereto;
the contact being much shorter than a quarter wavelength at the frequency of said current;
an output conductor connected to the lower conductive surface of the base;
the second and third coatings overlapping substantial portions of the upper conductive surface and being insulated therefrom by the film to form therewith radio frequency bypass capacitors, whereby parallel radio frequency paths are established from the common contact, through the first and second semiconductor devices, the bypass capacitors, the upper, side, and lower conductive surfaces, to the output conductor.

6. The apparatus of claim 5 wherein:
the first semiconductor device is a varactor;
and the second semiconductor device is a PIN diode.

7. The apparatus of claim 6 further comprising:
means for varying the bias of the PIN diode thereby to control the R-F current through the varactor.

8. The apparatus of claim 7 wherein:
the second and third coatings each have circular configurations;
the varactor is located in the center of the second coating;
and the PIN diode is located in the center of the third coating.

References Cited

UNITED STATES PATENTS

| | | | |
|---|---|---|---|
| 3,008,089 | 11/1961 | Uhlir | 307—88.5 X |
| 3,051,909 | 8/1962 | Engelbrecht | 330—4.9 X |
| 3,163,781 | 12/1964 | Barringer | 307—88.5 |
| 3,183,407 | 5/1965 | Yasuda et al. | 317—101 |

OTHER REFERENCES

"Selecting the Right Diode for R-F Switching Circuits," by R. Fekete; Electronics Mar. 22, 1965; pp. 70–76 relied upon; copy in 321–69(N.2).

JOHN F. COUCH, *Primary Examiner.*

G. GOLDBERG, *Assistant Examiner.*